(12) United States Patent
Ha

(10) Patent No.: US 8,636,401 B2
(45) Date of Patent: Jan. 28, 2014

(54) BACKLIGHT UNIT AND LIQUID CRYSTAL DISPLAY HAVING THE SAME

(71) Applicant: Samsung Display Co., Ltd., Yongin (KR)

(72) Inventor: Young-Suk Ha, Uiwang-Si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 0 days.

(21) Appl. No.: 13/712,638

(22) Filed: Dec. 12, 2012

(65) Prior Publication Data

US 2013/0100380 A1 Apr. 25, 2013

Related U.S. Application Data

(63) Continuation of application No. 13/172,433, filed on Jun. 29, 2011, now Pat. No. 8,337,067, which is a continuation of application No. 11/930,692, filed on Oct. 31, 2007, now Pat. No. 8,016,474.

(30) Foreign Application Priority Data

Nov. 7, 2006 (KR) .................. 10-2006-0109499

(51) Int. Cl.
  *F21V 7/04* (2006.01)
(52) U.S. Cl.
  USPC ........................................ 362/621; 362/608

(58) Field of Classification Search
  USPC .................. 362/608–610, 621, 622, 606, 607
  See application file for complete search history.

(56) References Cited

U.S. PATENT DOCUMENTS

| | | | | |
|---|---|---|---|---|
| 6,969,188 | B2 * | 11/2005 | Kuo | 362/613 |
| 7,591,577 | B2 * | 9/2009 | Liu et al. | 362/609 |
| 7,637,646 | B2 * | 12/2009 | Byun et al. | 362/608 |
| 7,976,207 | B2 * | 7/2011 | Kim et al. | 362/600 |
| 2008/0239750 | A1 * | 10/2008 | Chang | 362/609 |

* cited by examiner

*Primary Examiner* — Julie Shallenberger
(74) *Attorney, Agent, or Firm* — F. Chau & Associates, LLC

(57) ABSTRACT

A backlight unit for a liquid crystal display which can achieve substantially uniform luminance over the entire display screen includes: a light-guide plate guiding incident light and having a diffusion pattern for emitting light upward, the diffusion pattern being formed on at least one of upper and lower surfaces of the light-guide plate; and a point light source assembly disposed on at least one side portion of the light-guide plate, the point light source assembly including a plurality of point-light-source elements and a support substrate, in which the point-light-source elements are disposed on the support substrate and supply the light to the light-guide plate. An edge portion of one surface of the light-guide plate, which is adjacent to the point light source assembly, includes a first region corresponding to the point-light-source elements and a second region corresponding to a position between the point-light-source elements. The diffusion pattern may be formed in such a manner that the second region has a higher density than the first region.

14 Claims, 4 Drawing Sheets

BACKLIGHT UNIT AND LIQUID CRYSTAL DISPLAY HAVING THE SAME

CROSS-REFERENCE TO RELATED APPLICATIONS

This application is a continuation of, and claims priority from, U.S. patent application Ser. No. 13/172,433, filed on Jun. 29, 2011, which is in turn a continuation of, and claims priority from, Ser. No. 11/930,692 of Young-suk Ha, filed on Oct. 31, 2007, which in turn claims priority from Korean Patent Application No. 10-2006-0109499 filed on Nov. 7, 2006, in the Korean Intellectual Property Office, the contents of all of which are herein incorporated by reference in their entireties.

BACKGROUND OF THE INVENTION

1. Field of the Invention

The present disclosure is directed to a backlight unit and a liquid crystal display having the same, and more particularly to a backlight unit and a liquid crystal display having the same that can achieve uniform luminance over the entire display screen.

2. Description of the Prior Art

A liquid crystal display, which is one of most widely-used flat panel displays at present, includes substrates having electrodes thereon, and a liquid crystal layer interposed between the substrates. The liquid crystal display controls the amount of light transmitted through the liquid crystal layer by applying a voltage to the electrodes to rearrange liquid crystal molecules of the liquid crystal layer.

Since these liquid crystal molecules display an image by changing the transmittance of light depending on the direction and intensity of an electric field, the liquid crystal display requires light to display an image. Exemplary light sources used for the liquid crystal display include a light emitting diode (LED), a cold cathode fluorescent lamp (CCFL) and a flat fluorescent lamp (FFL).

Most of the conventional liquid crystal displays generally employ the CCFL, but recent liquid crystal displays show a tendency to employ the FFL and LED. Particularly, recently, the LED having a low power consumption and high luminance has been widely used for the liquid crystal display.

However, such an LED is a point light source, which emits light at a predetermined angle of less than 180 degrees. Therefore, although a plurality of LEDs are disposed in a row and emit light, a dark space is formed in a region located between the LEDs, so that the luminance of the display screen is non-uniform.

SUMMARY OF THE INVENTION

Exemplary embodiments of the present invention provide a backlight unit which can achieve uniform luminance over the entire display screen.

Exemplary embodiments of the present invention also provide a liquid crystal display having such a backlight unit.

According to an exemplary embodiment of the present invention, a backlight unit includes a light-guide plate guiding incident light and having a diffusion pattern for emitting light upward, the diffusion pattern being formed on at least one of upper and lower surfaces of the light-guide plate; and a point light source assembly disposed on at least one side portion of the light-guide plate, the point light source assembly including a plurality of point-light-source elements and a support substrate, in which the point-light-source elements are disposed on the support substrate and supply the light to the light-guide plate. An edge portion of one surface of the light-guide plate, which is adjacent to the point light source assembly, includes a first region corresponding to the point-light-source elements and a second region corresponding to a position between the point-light-source elements. The diffusion pattern may be formed in such a manner that the second region has a higher density than the first region.

According to another exemplary embodiment of the present invention, a backlight unit includes a light-guide plate guiding incident light and having a diffusion pattern for emitting light upward, the diffusion pattern being formed on at least one of upper and lower surfaces of the light-guide plate; and a point light source assembly disposed on at least one side portion of the light-guide plate, the point light source assembly including a plurality of point-light-source elements and a support substrate, in which the point-light-source elements are disposed on the support substrate and supply the light to the light-guide plate. The diffusion pattern may be formed on one surface of the light-guide plate, except for a predetermined edge portion of said one surface of the light-guide plate which is adjacent to the point light source assembly.

According to still another exemplary embodiment of the present invention, a backlight unit includes a light-guide plate guiding incident light and having a diffusion pattern for emitting light upward, the diffusion pattern being formed on at least one of upper and lower surfaces of the light-guide plate; a point light source assembly disposed on at least one side portion of the light-guide plate, the point light source assembly including a plurality of point-light-source elements and a support substrate, in which the point-light-source elements are disposed on the support substrate and supply the light to the light-guide plate; and a reflection film for dark regions disposed between the point-light-source elements, the reflection film for dark regions reflecting the light emitted from a side portion of the light-guide plate back to the light-guide plate.

According to an exemplary embodiment of the present invention, a liquid crystal display includes a liquid crystal panel displaying image information; and the backlight unit which is located beneath the liquid crystal panel and supplies light to the liquid crystal panel.

Other detailed aspects of the present invention are included in the following detailed description and the accompanying drawings.

DETAILED DESCRIPTION OF THE EXEMPLARY EMBODIMENTS

Figure 1:
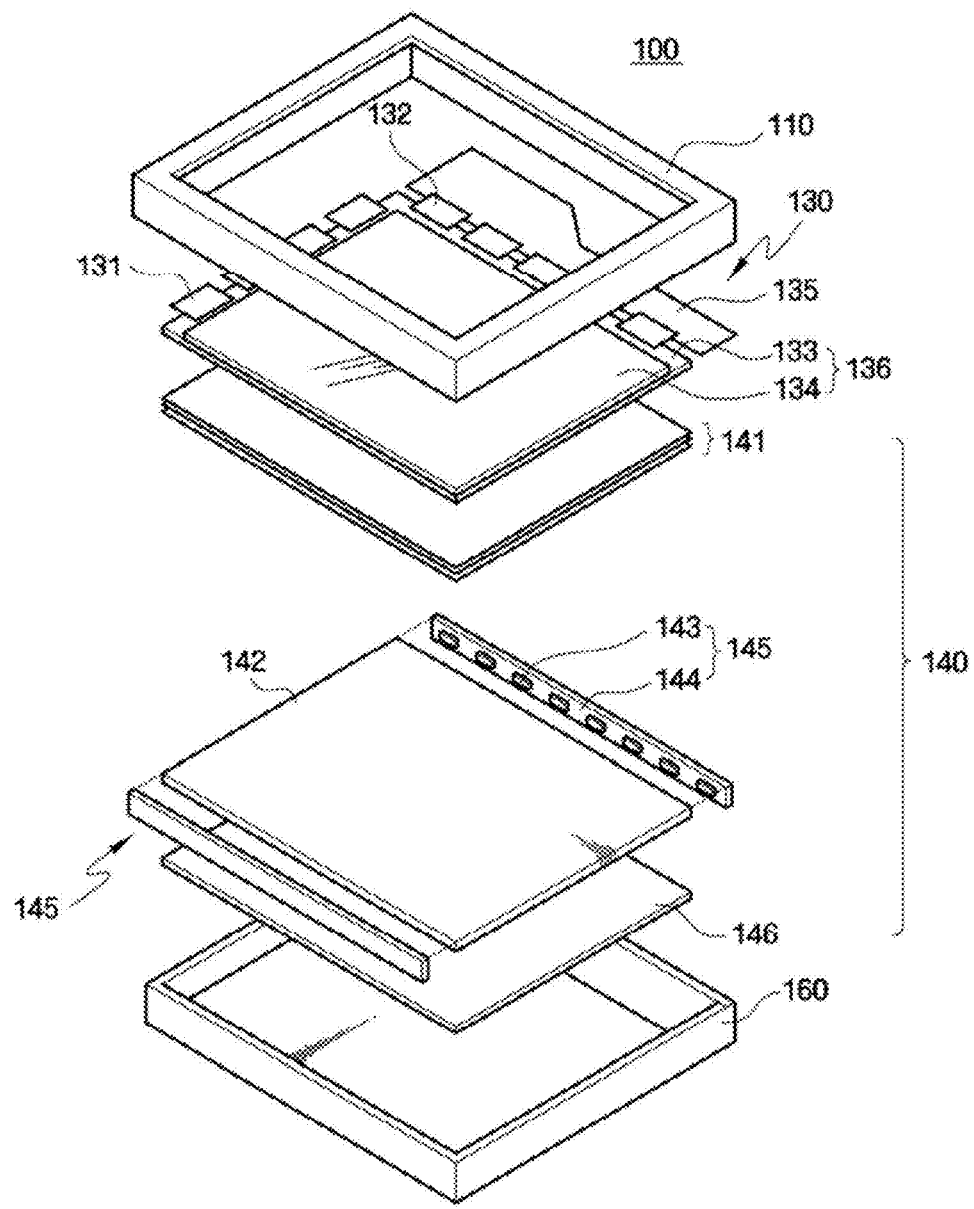
FIG. 1 is an exploded perspective view illustrating the construction of a liquid crystal display according to an exemplary embodiment of the present invention.

Features of the present invention, and methods for achieving them will be apparent to those skilled in the art from the detailed description of the embodiments together with the accompanying drawings. The scope of the present invention is not limited to the embodiments disclosed in the specification and the present invention can be realized by various types. It will be understood that when an element or layer is referred to as being "on," "connected to" or "coupled to" another element or layer, it can be directly on, connected to or coupled to the other element or layer or intervening elements or layers may be present. In the drawings, like numbers refer to like elements throughout.

Hereinafter, a liquid crystal display according to an embodiment of the present invention will be described in detail with reference to FIGS. 1 to 5.

FIG. 1 is an exploded perspective view illustrating the construction of a liquid crystal display according to an exemplary embodiment of the present invention.

Referring to FIG. 1, the liquid crystal display 100 according to an embodiment of the present invention includes a liquid crystal panel assembly 130, a backlight unit 140, an upper container 110 and a lower container 160.

The liquid crystal panel assembly 130 includes a liquid crystal panel 136, a gate tape carrier package 131, a data tape carrier package 132 and an integrated printed circuit board 135, in which the liquid crystal panel 136 contains a lower display panel 133, an upper display panel 134 and a liquid crystal layer (not shown) interposed between the two display panels.

In detail, the liquid crystal panel 136 contains the lower display panel 133 including gate lines (not shown), data lines (not shown), a thin film transistor array, a pixel electrode, and others, and the upper display panel 134 including a black matrix, a common electrode, and others, in which the upper display panel 134 is disposed to be opposite to the lower display panel 133. The liquid crystal panel 136 functions to display image information.

The gate tape carrier package 131 is connected to each gate line (not shown) formed on the lower display panel 133, and the data tape carrier package 132 is connected to each data line (not shown) formed on the lower display panel 133.

The integrated printed circuit board 135 is equipped with a plurality of driving elements to process gate driving signals inputted to the gate tape carrier package 131 and data driving signals inputted to the data tape carrier package 132. In other words, the integrated printed circuit board 135 is connected to the liquid crystal panel 136 and provides image information to the liquid crystal panel 136.

The backlight unit 140 includes optical sheets 141, a light-guide plate 142, a point light source assembly 145 and a reflection sheet 146.

Herein, the light-guide plate 142 functions to guide light provided from the point light source assembly 145 to the liquid crystal panel 136. The light-guide plate 142 has the shape of a plate, and is made of a plastic-based transparent material so as to efficiently guide light. For example, the light-guide plate 142 may be made of an acrylic resin such as polymethyl methacrylate (PMMA), polycarbonate or the like. When light incident through one side surface of the light-guide plate 142 reaches an upper or lower surface of the light-guide plate 142 at an angle greater than a threshold angle of the light-guide plate 142, the light is not emitted to the outside and is totally reflected from a corresponding surface of the light-guide plate 142 to be uniformly transferred through the inside of the light-guide plate 142.

The light-guide plate 142 is provided on the upper and/or lower surface thereof with a diffusion pattern (not shown) so that light in the light-guide plate 142 can be emitted to the liquid crystal panel 136 disposed on top of the light-guide plate 142. The diffusion pattern may be formed on the lower surface of the light-guide plate 142. That is, light reflected multiple times in the light-guide plate 142 is reflected from the diffusion pattern, and is emitted to the outside through the upper surface of the light-guide plate 142. In order to uniformly maintain the luminance of light outputted from the light-guide plate 142 through a front surface thereof, the diffusion pattern on one surface of the light-guide plate 142 may be formed to have different sizes and densities depending on the distance from the point light source assembly 145. The luminance of light outputted through the front surface can be maintained at a constant level, for example, by increasing either the density of the diffusion pattern or the size of the diffusion pattern in a direction away from the point light source assembly 145.

While such a diffusion pattern may be formed by silk screen printing of ink, embodiments of the present invention are not limited thereby, but a diffusion pattern having the same operational effect as that of the above can be constructed by forming a fine groove or protrusion on the light-guide plate 142.

The point light source assembly 145 is disposed at each of the two opposite sides of the light-guide plate 142. In such an arrangement structure, in order to enable light to be uniformly transferred to the entire display screen, it is preferred that the light-guide plate 142 is formed in a flat type with a uniform thickness. However, embodiments of the present invention are not limited to such a shape, and various shapes of light-guide plates may be employed for the present invention. The relation between the light-guide plate 142 and the point light source assembly 145 will be described below in detail.

The reflection sheet 146 is installed beneath the light-guide plate 142, and reflects light, which has been emitted downward from the light-guide plate 142, upward from the reflection sheet 146. The reflection sheet 146 reflects light, which has not been reflected from a diffusion pattern formed on one surface of the light-guide plate 142, back to a light emitting surface of the light-guide plate 142, thereby reducing a loss in light incident to the liquid crystal panel 136 and simultaneously improving the uniformity of light transmitted through the light emitting surface of the light-guide plate 142.

The reflection sheet 146 may be made from, for example, polyethylene terephthalate (PET) or the like, and one side of the reflection sheet 146 may be coated to form a diffusion layer including, for example, titanium dioxide and the like. When titanium dioxide is dried and fixed, it forms a white surface, thereby not only more uniformly diffusing light but also providing a predetermined reflection effect.

The optical sheets 141 are installed on the upper surface of the light-guide plate 142 so as to diffuse and condense light transferred from the light-guide plate 142. The optical sheets 141 include a diffusion sheet, a prism sheet, a protection sheet, and others. The diffusion sheet is located between the light-guide plate 142 and the prism sheet, and disperses light incident from the light-guide plate 142, thereby preventing light from being partially concentrated. The prism sheet includes triangular prisms uniformly arranged on an upper surface thereof. Generally, the prism sheet includes two sheets, in which the prisms of one sheet and the prisms of the other sheet are arranged to cross each other at a predetermined angle, thereby functioning to condense light diffused by the diffusion sheet in a direction perpendicular to the liquid crystal panel 136. Accordingly, most of light having passed through the prism sheet travels vertically, so that a uniform luminance distribution is obtained on the protection sheet. The protection sheet placed on the prism sheet functions to diffuse light for making the distribution of light uniform, as well as to protect the surface of the prism sheet. The construction of these optical sheets 141 is not limited to the aforementioned construction, but may be modified depending on the specifications of the liquid crystal display 100.

The liquid crystal panel 136 is installed on the protective sheet and is disposed together with the backlight unit 140 in the lower container 160. The lower container 160 includes sidewalls formed along the edges of the bottom surface thereof, which function to accommodate and fix the backlight unit 140 and the liquid crystal panel assembly 130 within the sidewalls, and to prevent the backlight unit 140 including a plurality of sheets from twisting. The integrated printed circuit board 135 of the liquid crystal panel assembly 130 is bent along an outside surface of the lower container 160 and is disposed on a rear surface of the lower container 160. Herein, the shape of the lower container 160 may be variously modified depending on a scheme of accommodating the backlight unit 140 or liquid crystal panel assembly 130 in the lower container 160.

The upper container 110 is disposed to be coupled with the lower container 160 so as to cover an upper surface of the liquid crystal panel assembly 130 accommodated in the lower container 160. The upper container 110 includes a window formed on an upper surface thereof so as to expose the liquid crystal panel assembly 130 to the outside.

The upper container 110 may be coupled with the lower container 160 by means of a hook (not shown). For example, a hook is provided on an outside surface of the sidewall of the lower container 160, and a hook insertion hole (not shown) corresponding to the hook may be formed on a side surface of the upper container 110. Therefore, as the upper container 110 is lowered and then coupled with the lower container 160, the hook provided on the lower container 160 is inserted into the hook insertion hole foil led on the upper container 110, thereby coupling the lower container 160 with the upper container 110. In addition, other various coupling manners may be employed to couple the upper container 110 to the lower container 160.

Hereinafter, the relation between the light-guide plate and the point light source assembly in the liquid crystal display according to an embodiment of the present invention will be described with reference to FIGS. 2 and 3. Herein, FIG. 2 is a bottom view illustrating the light-guide plate and point light source assembly shown in FIG. 1, and FIG. 3 is a graph illustrating a radiation characteristic of the point light source shown in FIG. 2.

Figure 2:
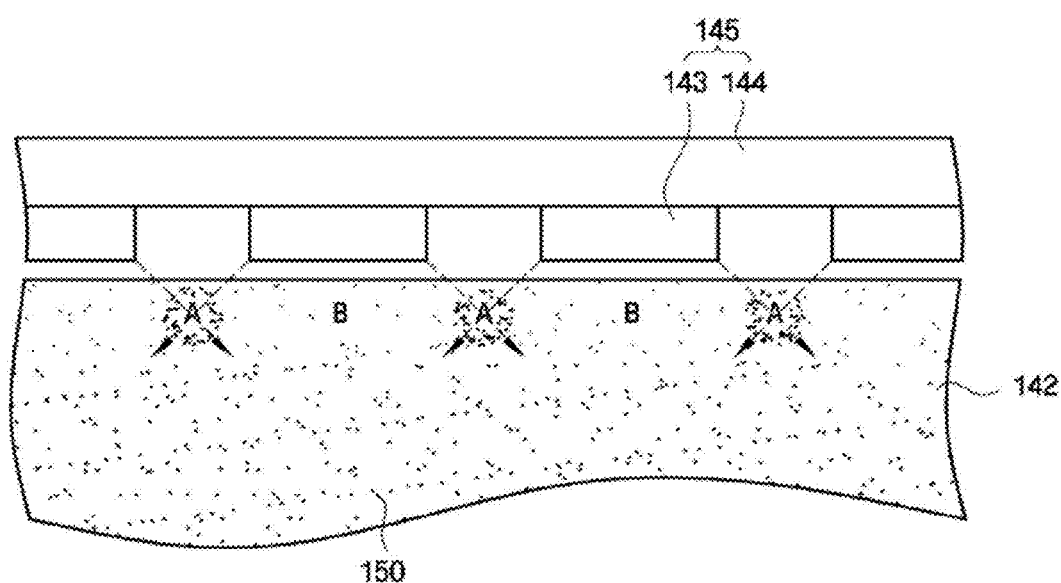
FIG. 2 is a bottom view illustrating the light-guide plate and point light source assembly shown in FIG. 1.
Figure 3:
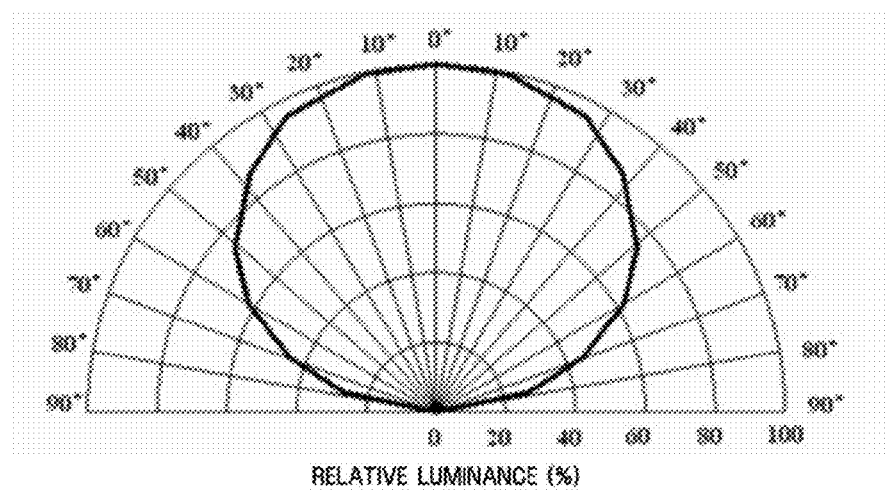
FIG. 3 is a graph illustrating a radiation characteristic of the point light source shown in FIG. 2.

Referring to FIG. 2, the point light source assembly 145 functions to supply light to the liquid crystal panel, which is a passive light-emitting device. The point light source assembly 145 includes a plurality of point-light-source elements 143 and a support substrate 144, on which the point light sources elements 143 are disposed.

The point-light-source elements 143 are fixedly disposed in a constant interval on one surface of the support substrate 144 through a contact terminal (not shown). Such a support substrate 144 may be formed in the shape of a long square plate. For example, the support substrate 144 may include a printed circuit board (PCB) or flexible printed circuit board (FPC).

The point light source element 143 includes a light-emitting element which directly emits light. For example, the point light source element 143 may include a light emitting diode (LED), an incandescent lamp, a halogen incandescent lamp, and others. An LED having excellent color reproducibility and a low power consumption characteristic may be used as the point light source element 143. The point light source element 143 includes a frame (not shown) and a light emitting chip for red, green and blue, and is equipped in the frame. The red light, green light and blue light emitted from these light emitting chips are mixed to produce white light.

In this case, as shown in FIG. 3, it can be understood that the greater the emitting angle of light emitted from the point light source element 143 is, the lower the relative luminance. For example, when the light emitting angle is about 60 degrees, a luminance of about 60% of light emitted to the front side can be obtained.

Therefore, as shown in FIG. 2, when the plurality of point-light-source elements 143 are used as a light source, dark regions "A" and light regions "B" can appear in the edge portion of one surface of the light-guide plate 142, which is adjacent to the point light source assembly 145. That is, in the edge portion of one side of the light-guide plate 142, the light regions "B" are formed at regions corresponding to the point-light-source elements 143, and dark regions "A" are formed at regions corresponding to positions between the point-light-source elements 143. In order to prevent a luminance difference due to these light regions "B" and dark regions "A", the diffusion pattern 150 is densely formed so as to have a high density with respect to the regions corresponding to the dark regions "A" in one side of the light-guide plate 142. In contrast, with respect to the regions corresponding to the light regions "B" in one side of the light-guide plate 142, the diffusion pattern 150 is sparsely formed so as to have a low density.

Therefore, although the dark regions "A" of the light-guide plate 142 are provided with a relatively small amount of light from the point-light-source elements 143, it is possible to increase light diffusion efficiency toward the upper surface of the light-guide plate 142 by forming the diffusion pattern 150 of a relatively high density on the dark regions "A". In addition, although the light regions "B" of the light-guide plate 142 are provided with a relatively large amount of light from the point-light-source elements 143, it is possible to decrease a light diffusion efficiency toward the upper surface of the light-guide plate 142 by forming the diffusion pattern 150 of a relatively low density on the light regions "B". Therefore, it is possible to prevent the dark regions "A" and light regions "B" from appearing, by uniformly maintaining the luminance of light which is output from the edge portion of one side of the light-guide plate 142 adjacent to the point light source assembly 145 toward the upper surface of the light-guide plate 142.

Figure 4:
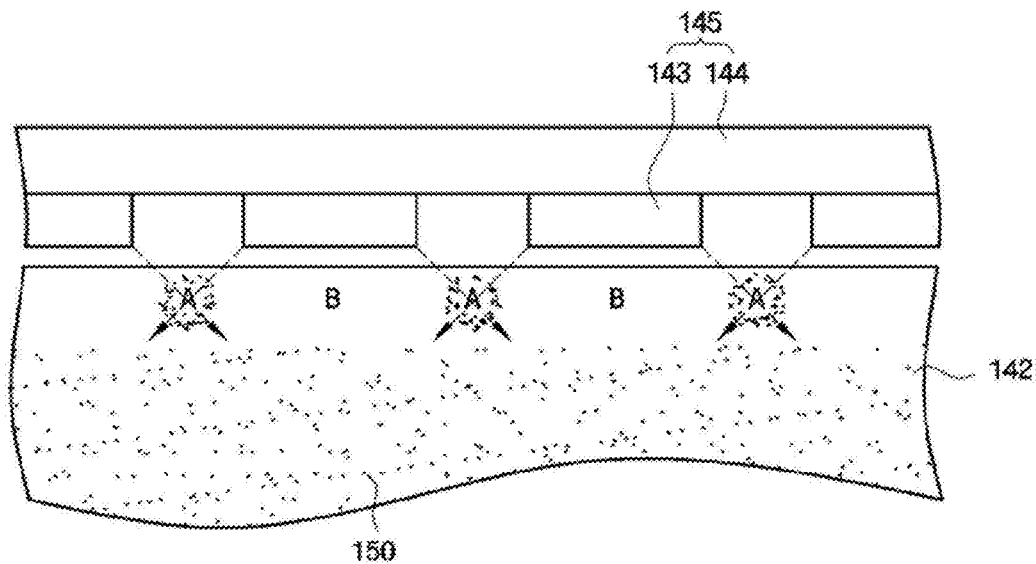
FIGS. 4 and 5 are views illustrating modified examples of the light-guide plate shown in FIG. 2.
Figure 5:
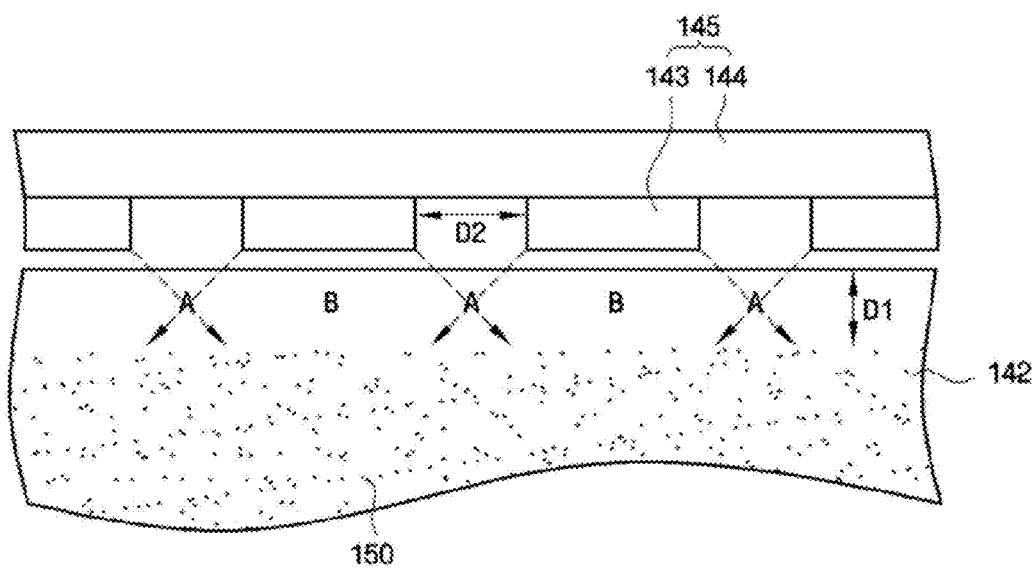

Hereinafter, various modified examples of the light-guide plate according to an embodiment of the present invention will be described with reference to FIGS. 4 and 5. FIGS. 4 and 5 are views illustrating modified examples of the light-guide plate shown in FIG. 2.

As shown in FIG. 4, it is possible to further decrease the light diffusion efficiency toward the upper surface of the light-guide plate 142 by removing the diffusion pattern 150 from the light regions "B" of the light-guide plate 142 corresponding to the point-light-source elements 143.

In addition, as shown in FIG. 5, it is possible to remove the diffusion pattern 150 of the dark regions "A" of the light-guide plate 142 corresponding to positions between to the point-light-source elements 143, as well as the diffusion pattern 150 of the light regions "B" of the light-guide plate 142 corresponding to the point-light-source elements 143. In this case, the luminance is decreased with respect to the edge portion of one side of the light-guide plate 142 adjacent to the point light source assembly 145, so that it is possible to prevent the dark regions "A" and light regions "B" from appearing.

Herein, a width "D1" of the diffusion pattern 150 removed from one side portion, that is, a width "D1" of the edge portion of one side of the light-guide plate 142, in which there is no diffusion pattern 150, may be equal to or greater than an interval "D2" between the point-light-source elements 143. For example, when the interval "D2" between the point-light-source elements 143 is within a range of 4 to 5 mm, the width "D1" of the removed portion in the diffusion pattern 150 may be 4 to 6 mm.

Figure 6:
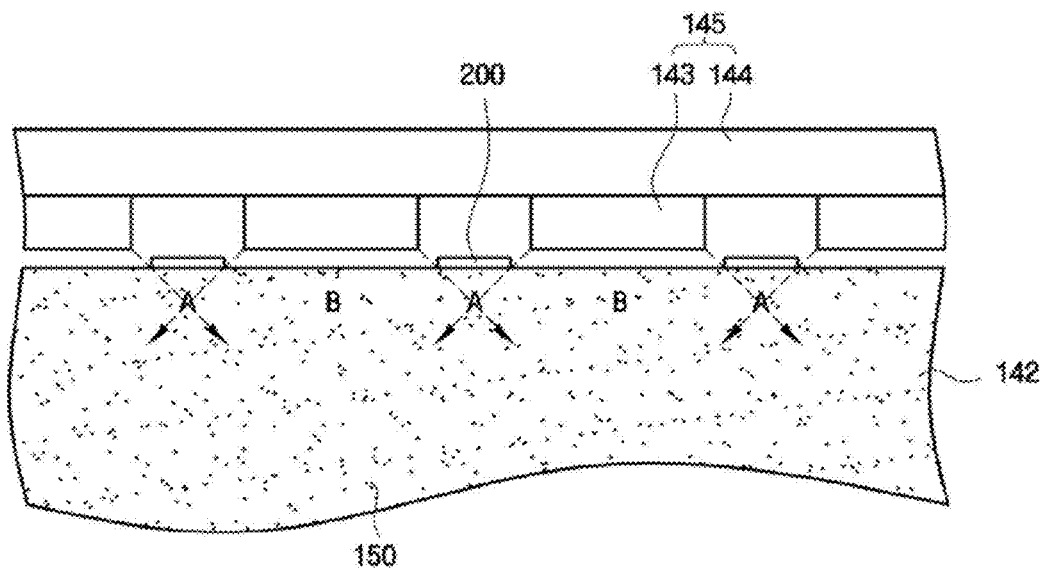
FIG. 6 is a bottom view illustrating a light-guide plate and a point light source assembly that are included in the liquid crystal display according to another exemplary embodiment of the present invention.

Hereinafter, a liquid crystal display according to another exemplary embodiment of the present invention will be described with reference to FIGS. 6 and 7. FIG. 6 is a bottom view illustrating a light-guide plate and a point light source assembly which are included in the liquid crystal display according to another exemplary embodiment of the present invention. For convenience of description, components having the same functions as those shown in FIGS. 1 to 5 according to aforementioned embodiment of the present invention are indicated with the reference numerals, a detailed description thereof will be omitted.

That is, as shown in FIG. 6, in order to increase the luminance of the dark regions "A", reflection films 200 for dark regions are provided at side portions of the light-guide plate 142 corresponding to the positions between the point-light-source elements 143. The reflection films 200 for dark regions reflect light emitted from the inside of the light-guide plate 142 through the side portions of the light-guide plate 142 adjacent to the dark regions "A", back to the inside of the light-guide plate 142, so that the light is emitted to the top of the light-guide plate 142 through the diffusion pattern 150 formed at the dark regions "A", thereby increasing the luminance of the dark regions "A".

The reflection films 200 for dark regions may be made from, for example, polyethylene terephthalate (PET) or the like, and one side of the reflection films 200 may be coated to form a diffusion layer including, for example, titanium dioxide and the like. When titanium dioxide is dried and fixed, it forms a white surface having a shape of frost, thereby not only more uniformly diffusing light but also providing a predetermined reflection effect.

Hereinafter, an embodiment of the present invention will be described with reference to FIG. 7. FIG. 7 is a view illustrating a modified example of the reflection film for dark regions shown in FIG. 6.

Figure 7:
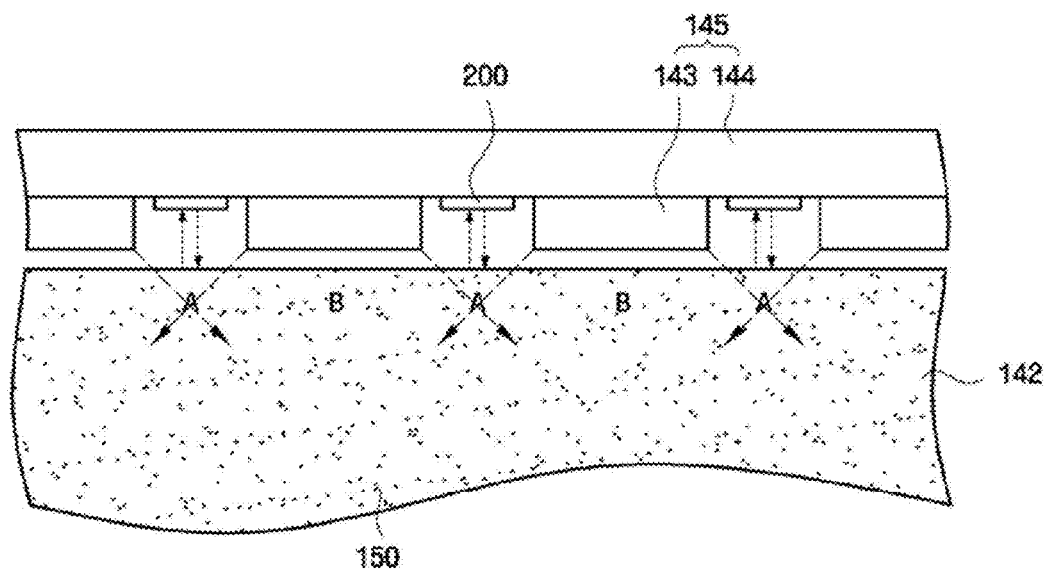
FIG. 7 is a view illustrating a modified example of the reflection film for the dark regions shown in FIG. 6.

As shown in FIG. 7, in order to increase the luminance of the dark regions "A", reflection films 200 for dark regions are provided on portions of the support substrate 144 corresponding to the positions between the point-light-source elements 143. In this case, light, which is emitted from the inside of the light-guide plate 142 through the side portions of the light-guide plate 142 adjacent to the dark regions "A", is reflected back to the inside of the light-guide plate 142 by the reflection films 200 for the dark provided on the support substrate 144, so that the light is emitted to the top of the light-guide plate 142 through the diffusion pattern 150 formed at the dark regions "A", thereby increasing the luminance of the dark regions "A".

While the embodiments of the present invention shown in FIGS. 6 and 7 describe an example in which the diffusion pattern 150 is uniformly formed in the edge portion of one side of the light-guide plate 142 adjacent to the point light source assembly 145, embodiments of the present invention is not limited thereto. That is, an embodiment of the present invention may be constructed by combining the reflection films 200 for dark regions and the light-guide plate 142 having the diffusion pattern 150 formed thereon, which is described with reference to FIGS. 1 to 5.

As described above, the various embodiments of the present invention can be achieved by using the liquid crystal display including a flat type of light-guide plate which contains a point light source assembly on each of the two opposite sides thereof. In addition, the embodiments of the present invention can be identically applied to a liquid crystal display including a wedge type light-guide plate which contains a point light source assembly on one side thereof.

As described above, according to the backlight unit and the liquid crystal display having the same based on an embodiment of the present invention, dark regions corresponding to positions between point-light-source elements can be substantially removed by changing a diffusion pattern formed on one side of the light-guide plate adjacent to the point light source assembly, thereby achieving a substantially uniform luminance over the entire display screen.

Although exemplary embodiments of the present invention has been described for illustrative purposes, those skilled in the art will appreciate that various modifications, additions and substitutions are possible, without departing from the scope and spirit of the invention as disclosed in the accompanying claims. Therefore, it should be appreciated that the embodiments described above are not imitative, but only illustrative.

What is claimed is:

1. A backlight unit comprising:
   a light-guide plate which guides incident light and has diffusion patterns for emitting light upward, the diffusion patterns being formed on at least one of upper and lower surfaces of the light-guide plate; and
   a point light source assembly disposed on at least one side surface of the light-guide plate, the point light source assembly comprising a plurality of point-light-source elements and a support substrate, in which the point-light-source elements are disposed on the support substrate and supply the light to the light-guide plate,
   wherein at least one edge portion of one surface of the light-guide plate, which is adjacent to the point light source assembly, comprises a first region corresponding to the point-light-source elements and a second region corresponding to a position between the point-light-source elements, wherein the at least one side surface of the light-guide plate is substantially flat, and
   wherein the diffusion patterns are formed on the second region and not formed on the first region.

2. The backlight unit of claim 1, wherein a width of the edge portion of the surface of the light-guide plate is equal to or greater than an interval between adjacent point-light-source elements, and
   wherein a direction of the width is perpendicular to a direction of the interval.

3. The backlight unit of claim 1, wherein a width of the edge portion of the surface of the light-guide plate is within the range of about 4 to 6 mm.

4. The backlight unit of claim 1, wherein an interval between adjacent point-light-source elements is within the range of about 4 to 5 mm.

5. The backlight unit of claim 1, further comprising a plurality of reflection films for the second region disposed between the point-light-source elements, the reflection film for the second region reflecting the light emitted from a side portion of the light-guide plate back to the light-guide plate.

6. The backlight unit of claim 5, wherein the reflection film for the second region is formed on a side portion of the light-guide plate corresponding to the position between the point-light-source elements.

7. The backlight unit of claim 5, wherein the reflection film for the second region is formed on the support substrate corresponding to the position between the point-light-source elements.

8. A liquid crystal display comprising:
a liquid crystal panel displaying image information; and
a backlight unit which is located beneath the liquid crystal panel and supplies light to the liquid crystal panel, wherein the backlight unit comprises:
a light-guide plate which guides incident light and has diffusion patterns for emitting light upward, the diffusion patterns being formed on at least one of upper and lower surfaces of the light-guide plate; and
a point light source assembly disposed on at least one side surface of the light-guide plate, the point light source assembly comprising a plurality of point-light-source elements and a support substrate, in which the point-light-source elements are disposed on the support substrate and supply the light to the light-guide plate,
wherein at least one edge portion of one surface of the light-guide plate, which is adjacent to the point light source assembly, comprises a first region corresponding to the point-light-source elements and a second region corresponding to a position between the point-light-source elements, wherein the at least one side surface of the light-guide plate is substantially flat, and wherein the diffusion patterns are formed on the second region and not formed on the first region.

9. The liquid crystal display of claim 8, wherein a width of the edge portion of the surface of the light-guide plate is equal to or greater than an interval between adjacent point-light-source elements, and wherein a direction of the width is perpendicular to a direction of the interval.

10. The liquid crystal display of claim 8, wherein a width of the edge portion of the surface of the light-guide plate is within the range of about 4 to 6 mm.

11. The liquid crystal display of claim 8, wherein an interval between adjacent point-light-source elements is within the range of about 4 to 5 mm.

12. The backlight unit of claim 1, further comprising a plurality of reflection films for the second region disposed between the point-light-source elements, the reflection film for the second region reflecting the light emitted from a side portion of the light-guide plate back to the light-guide plate.

13. The liquid crystal display of claim 12, wherein the reflection film for the second region is formed on a side portion of the light-guide plate corresponding to the position between the point-light-source elements.

14. The liquid crystal display of claim 12, wherein the reflection film for the second region is formed on the support substrate corresponding to the position between the point-light-source elements.

* * * * *